(12) United States Patent
Lavania et al.

(10) Patent No.: US 12,235,747 B2
(45) Date of Patent: Feb. 25, 2025

(54) DYNAMIC RISK BASED ANALYSIS MODEL

(71) Applicant: KYNDRYL, INC., New York, NY (US)

(72) Inventors: Sarita Lavania, Bengaluru (IN); Nalini M, Chennai (IN); Gautam K. Bhat, Kadri (IN); Muniyandi Perumal Thevar, Madurai (IN)

(73) Assignee: Kyndryl, Inc., New York, NY (US)

( * ) Notice: Subject to any disclaimer, the term of this patent is extended or adjusted under 35 U.S.C. 154(b) by 473 days.

(21) Appl. No.: 16/987,455

(22) Filed: Aug. 7, 2020

(65) Prior Publication Data
US 2022/0043735 A1 Feb. 10, 2022

(51) Int. Cl.
G06F 11/34 (2006.01)
G06F 9/48 (2006.01)
G06F 9/54 (2006.01)
G06F 17/18 (2006.01)

(52) U.S. Cl.
CPC ........ *G06F 11/3438* (2013.01); *G06F 9/4831* (2013.01); *G06F 9/542* (2013.01); *G06F 17/18* (2013.01)

(58) Field of Classification Search
CPC .... G06F 11/3438; G06F 9/4831; G06F 9/542; G06F 17/18
USPC ....................................................... 702/127
See application file for complete search history.

(56) References Cited

U.S. PATENT DOCUMENTS

| 10,084,809 | B1* | 9/2018 | Rambo | G06F 16/24578 |
| 10,242,369 | B2 | 3/2019 | Klavins | |
| 11,276,501 | B1* | 3/2022 | Brook | G16H 50/30 |
| 2002/0103688 | A1* | 8/2002 | Schneider | G06Q 10/0637 |
| | | | | 705/26.1 |
| 2010/0106668 | A1 | 4/2010 | Hawthorne | |
| 2014/0278731 | A1* | 9/2014 | Griffin | G06Q 50/02 |
| | | | | 705/7.28 |
| 2015/0278640 | A1* | 10/2015 | Johnson | G06V 20/188 |
| | | | | 382/110 |

(Continued)

FOREIGN PATENT DOCUMENTS

KR 101357730 B1 1/2014

OTHER PUBLICATIONS

"An online market to connect small farmers with urban consumers", Euromontana, Printed Apr. 28, 2020, 4 pages, <https://www.euromontana.org/en/online-market-connect-small-farmers-urban-consumers/>.

(Continued)

*Primary Examiner* — Michael P Nghiem
(74) *Attorney, Agent, or Firm* — Erik Swanson; Andrew M. Calderon; Calderon Safran & Wright P.C.

(57) ABSTRACT

Embodiments of the present invention provide a computer system, a computer program product, and a method that comprises receiving and storing input data from at least two users; calculating a risk score for each identified risk in the received data based on priority risk factors affecting respectively identified risks; dynamically optimizing a risk analysis of the received input for multiple users within a user interface of a computing device by recalculating risk scores based on the received data and identified risks; and generating a notification for the user interface of the computing device based on the dynamic optimization of the risk analysis of the received input.

20 Claims, 4 Drawing Sheets

(56) References Cited

U.S. PATENT DOCUMENTS

| | | | | |
|---|---|---|---|---|
| 2015/0278966 | A1* | 10/2015 | Johnson | G06Q 10/063 702/2 |
| 2017/0311559 | A1* | 11/2017 | Ebert | G01N 33/246 |
| 2019/0138512 | A1* | 5/2019 | Pourmohammad | G05B 15/02 |
| 2020/0272971 | A1* | 8/2020 | Ruff | G06Q 10/06313 |
| 2021/0058296 | A1* | 2/2021 | Buck | H04L 63/20 |

OTHER PUBLICATIONS

Balaji, Sindhuja "India's Farmers Could Be Making More Money Soon, With The Help Of Clever Agritech Startups", Mar. 19, 2018, 6 pages, <https://www.forbes.com/sites/sindhujabalaji/2018/03/19/indias-farme/#1a05cce71600>.

"Farmer.Live", Printed Apr. 28, 2020, 1 page, <https://www.farmer.live/about-us.html>.

Sikarwar et al., "Farmers may be allowed to sell directly to consumers", Last Updated: Mar. 25, 2014, 3 pages, <https://economictimes.indiatimes.com/news/economy/agriculture/farmers-may-be-allowed-to-sell-directly-to-consumers/articleshow/32623139.cm%E2%80%A6>.

Nidheesh, M.K., "An app that helps farmers cut the middleman out", Updated: Dec. 2, 2015, livemint, 5 pages, <https://www.livemint.com/Consumer/nQLEyDHTQvkVAodbfA6B9L/An-app-that-helps-farmers-cut-the-middleman-out.html>.

Pujara, Mandeep, "F2C (Farmer to consumer)—Farm Direct Marketing to get more share from consumer rupee", Printed Jul. 24, 2020, 6 pages, <https://www.linkedin.com/pulse/f2c-farmer-consumer-farm-direct-marketing-mandeep-pujara/>.

* cited by examiner

DYNAMIC RISK BASED ANALYSIS MODEL

BACKGROUND

The present invention relates generally to the field of risk analysis, and more specifically dynamic risk-based analysis between multiple users.

Risk analysis is a technique used to identify and assess factors that may jeopardize the success of a project or achieving a goal. Generally, this technique helps to define preventive measures to reduce the probability of these factors from occurring and identify countermeasures to successfully deal with these constraints when they develop to avert possible negative effects on the competitiveness of the company. One of the more popular methods to perform a risk analysis in the computer field is called facilitated risk analysis process.

An engagement model is a plan that determines the basis of collaboration between the software development company and the client. Commonly, the engagement model is the foundation on which a whole project stand. The focus of an engagement model is on the wants, needs, and interest of the client. It also ensures flexibility, responsibility, and the level of control. The dynamic engagement approach recognizes that an organization's environment is not some set of fixed, impersonal forces. Rather, it is a complex, dynamic web of people interacting with each other that constantly changes and adapts.

Data collection is the process of gathering and measuring information on targeted variables in an established system, which then enables one to answer relevant questions and evaluate outcomes. Data collection is a component of research in all fields of study including physical and social sciences, humanities, and business. While methods vary by discipline, the emphasis on ensuring accurate and honest collection remains the same. The goal for all data collection is to capture quality evidence that allows analysis to lead to the formulation of convincing and credible answers to the questions that have been posed.

SUMMARY

Embodiments of the present invention provide a computer system, a computer program product, and a method that comprises receiving and storing input data from at least two users; calculating a risk score for each identified risk in the received data based on priority risk factors affecting respectively identified risks; dynamically optimizing a risk analysis of the received input for multiple users within a user interface of a computing device by recalculating risk scores based on the received data and identified risks; and generating a notification for the user interface of the computing device based on the dynamic optimization of the risk analysis of the received input.

DETAILED DESCRIPTION

Embodiments of the present invention recognize the need for an improvement to current dynamic risk analysis technologies for multiple users by generating a risk-based analysis using a risk-based analytical engine technique to support and collect data for a user interface. Embodiments of the present invention provide systems, methods, and computer program products for an improvement to existing risk-based analysis technologies. Currently, data is the most valuable asset to possess in a growing trend of data collection, and engagement models use this collected data to generate prediction models of a single user. Thus, significant resources are allocated for collecting data for single users. Generally, risk-based analysis is performed by using risk to prioritize and emphasize the appropriate tests during test execution. Commonly, risk-based analysis calculates the probability of occurrence of an undesirable outcome, and the outcome is also associated with an impact. However, embodiments of the present invention provide an improvement to current risk-based analysis services by implementing a risk-based analytical engine to dynamically optimize a user interface that details and displays collected data and analysis of risk of multiple users. Embodiments of the present invention receives and stores input data from multiple users, analyzes risks associated with received input data, dynamically optimizes a user interface based on the risk analysis, generates and transmits notifications to a user based on the optimization of the user interface to improve efficiency in manufacturing of a product, and manufactures products based on the optimization of the risk analysis within the user interface.

Figure 1:
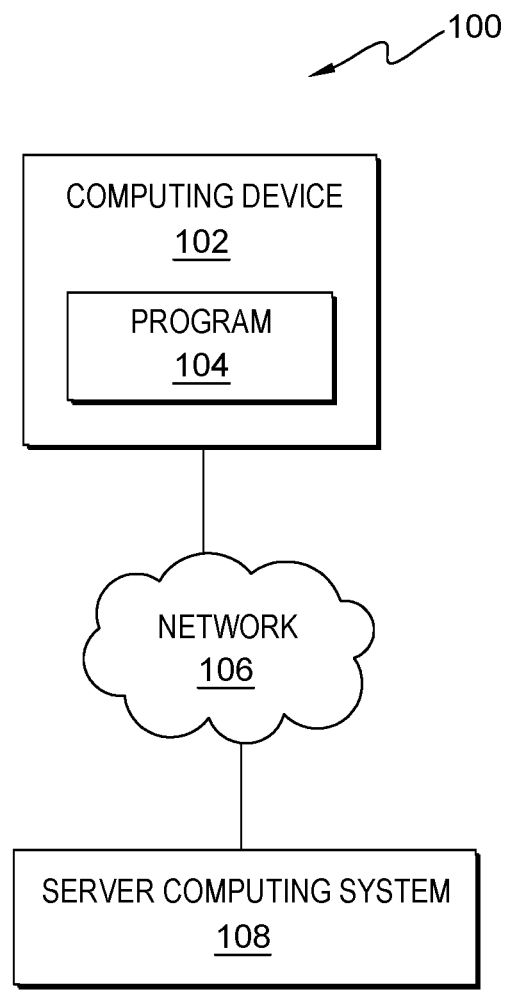
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 5.

The computing device 102 may include a program 104. The program 104 may be a stand-alone program on the computing device 102. In another embodiment, the program 104 may be stored on a server computing device 108. In this embodiment, the program 104 receives and stores input data from multiple users; analyzes risks associated with received input data; dynamically optimizes a user interface based on the risk analysis; and generates and transmits notifications to a user based on the optimization of the user interface. For example, the program 104 receives input data from multiple users that encompasses crop details, land details, quality of the soil, farming experiences, expected delivery dates, quantity of produce, quality of produce, wanted produce, area of preference, risk acceptance, and alternate areas and products; analyzes the risk of the received input data using a risk-based analytical engine; automatically modifies a user interface that displays the received input data based on the risk analysis; and generates and transmits notifications on a computing device to alert of a change to the received input data received based on the optimization or confirmation of the received input data based on the optimization.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
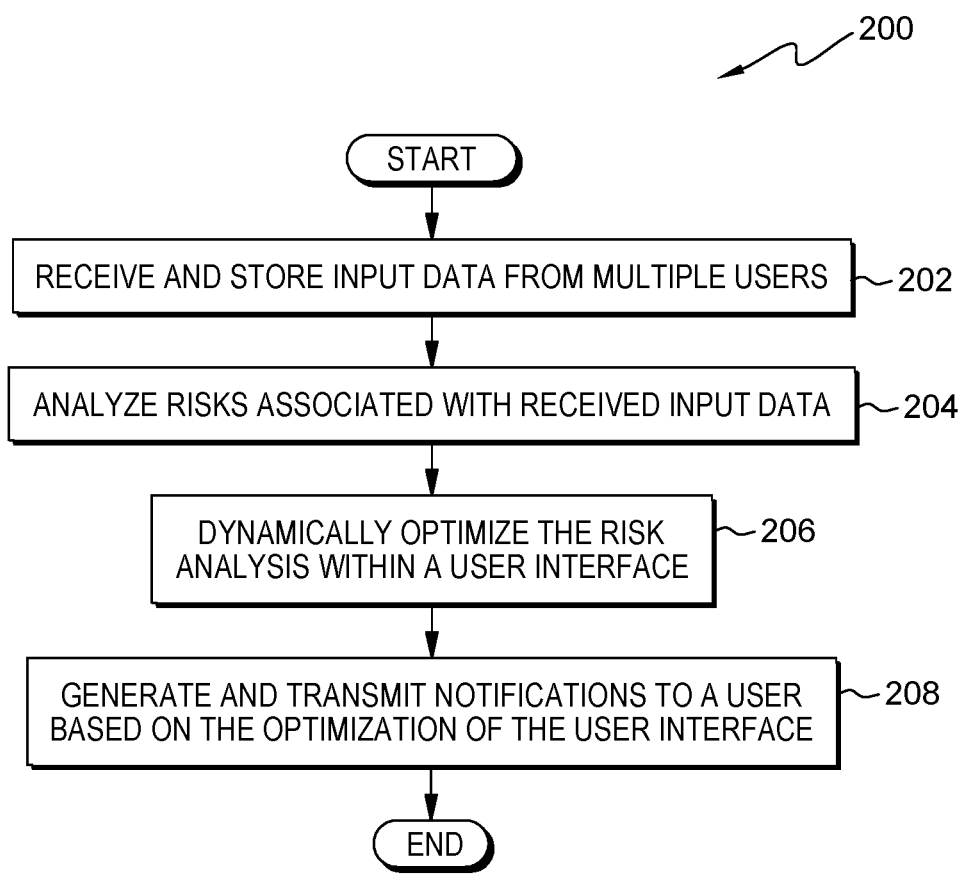
FIG. 2 is a flowchart illustrating operational steps for dynamically assessing risk within a user interface, in accordance with at least one embodiment of the present invention.

FIG. 2 is a flowchart 200 illustrating operational steps for dynamically assessing risk within a user interface, in accordance with at least one embodiment of the present invention.

In step 202, the program 104 receives and stores input data from multiple users. In this embodiment, the program 104 received opt-in/opt-out permission from a user to gain access to the input data, which allows the program 104 to receive input data and in response to receiving input data, store the received input data within a user interface for multiple users. In this embodiment, received input is defined as forms of information that are associated with a risk. In this embodiment, a risk is defined as a determent in a user's ability to obtain the received input, such as a good, service, and output. For example, the program 104 receives crop information from one user and preference input information from another user.

In step 204, the program 104 analyzes risks associated with received input data. In this embodiment, the program 104 analyses risks associated with the received input data by using a risk-based analysis engine to calculate a risk score for a user based on that user's received input, where the risk score is within a range of 1 to 5 with a score of 1 when there is no risk and a score of 5 for the maximum risk; compare the calculated risk score for additional users to the calculated risk score for the user; and determine a priority order based on the comparison of calculated risk scores. In this embodiment, the program 104 calculates a risk score by assigning values for multiple factors for a single user's received input and aggregates the values for the factors that are present in the analysis.

In this embodiment, the program 104 assigns values by inspecting the received input from the user in the form of user preferences. In this embodiment, the program 104 compares the calculated risk scores by calculating the risk score for a single user and at least another user to quantify a difference between the calculated risk scores for the multiple users. In some embodiments, an identified risk can be defined as a risk or a detriment to a goal, production, or performance. In this embodiment, the program 104 assigns 1 point for an identified risk. In another embodiment, the program 104 determines that there are multiple identified risks at one time and sums these multiple identified risks to calculate an overall risk score. In another embodiment, the program 104 may assign more than 1 point for the identified risk, such as loss of crop from multiple users. In this embodiment, the program 104 does not recognize a single risk that would automatically calculate a score of 5 due to the nature of multiple users sharing input and risks, such as multiple crops.

In another embodiment, the program 104 may assign multiple points to the identified risk by factoring in multiple elements of the identified risk. For example, the program 104 identifies crop loss as a value of 3, but within crop loss, the program 104 identifies inconsistent watering schedule as a risk with a value of 1, destruction of crop due to wildlife as a risk with a value of 1, and temperature fluctuation due to natural disaster as a risk with a value of 1. In another embodiment, there are factors that mitigate a risk score from increasing. For example, the program 104 identifies that a user harvests an excess of a particular crop, the risk score may decrease. Furthermore, in this example, the program 104 identifies that two user user loses their crop, reaching a maximum risk score, but another uses harvests excess and reduces the risk score below the maximum risk score, thus there is no single act that alone has a value of the maximum risk score.

In this embodiment, the program 104 determines the priority order by ranking the calculated risk scores for multiple users from high risk to low risk. In this embodiment, the program 104 defines low risk for the calculated risk score as less than or equal to 3. In this embodiment, the program 104 defines high risk for the calculated risk score as greater than 3. For example, the program 104 analyzes risks associated with a crop's harvest in a specific location during a specific time period, calculates a user's risk score to be 3, compares the user's risk score of 3 to another user's risk score of 2, and another user's risk score of 5, and determines the priority order of the users based on each user's calculated risk score. Furthermore, where the resource is a food crop and the industry is farming, variables can include availability of a crop, crop type, location of the crop, weather changes associated with the location of the crop, price of the crop, revised price, actual yield data, actual delivery data, seed cost, use of equipment, irrigation cost, labor cost, fertilizer cost, crop insurance, and time needed to harvest the crop.

In step 206, the program 104 dynamically optimizes the risk analysis within a user interface. In this embodiment, the program 104 dynamically optimizes the risk analysis within a user interface by modifying the risk analysis to reflect any changes to received user input or a determination of priority for multiple users based on each user's calculated risk score. This step will be further explained in a subsequent figure. See FIG. 3.

In this embodiment, the program 104 dynamically optimizes the risk analysis within a user interface by determining an initial quality of received input, calculating cost of actual production of that received input, identifying requirements from multiple users in response to the calculated cost, recalculating cost in response to applying the identified requirements, and verifying the recalculated cost by determining a percentage of deviation. In this embodiment, the program 104 dynamically optimizes the risk analysis by identifying a risk, calculating changes that are associated with that risk, applying the changes associated that risk uniformly across multiple user's input, and notifying users to the applied changes associated to the identified risk. For example, if flooding occurs in a specific location then other users are able to deliver products with an increased price and that price is shared with all users in that community, any risks the program 104 identifies are transmitted in the form of a notification to the community.

In another embodiment, the program 104 dynamically optimizes a risk analysis of the received input by identifying at least one change of a variable that affects at least one risk score associated with the received input and automatically updating a calculated risk score on at least one identified change of the variable that affects the calculated risk score associated with the received input. For example, the program 104 identifies a delay in production of a crop and automatically updates the calculated risk score associated with the production of that crop in response to identifying the delay.

In step 208, the program 104 generates and transmits notifications to a user based on the optimization of the risk analysis within the user interface. In this embodiment, the program 104 generates notifications to alert the user of the optimization of the user interface. In another embodiment, the program 104 generates notifications to alert the user of a confirmation of the received input. In this embodiment, the program 104 transmits the generated notification to a computing device 102 to display within the user interface the optimization of the received input. In another embodiment, the program 104 transmits the generated notification to the computing device 102 to display within the user interface the confirmation of the received input.

Accordingly, in some embodiments, the program 104 can manufactures products. In some embodiments, the program 104 can use the information generated in the notification to order manufactured products. In yet other embodiments, the program 104 can the deliver the ordered, manufactured product as part of an end to end system based on the optimization of the risk analysis within the user interface.

Figure 3:
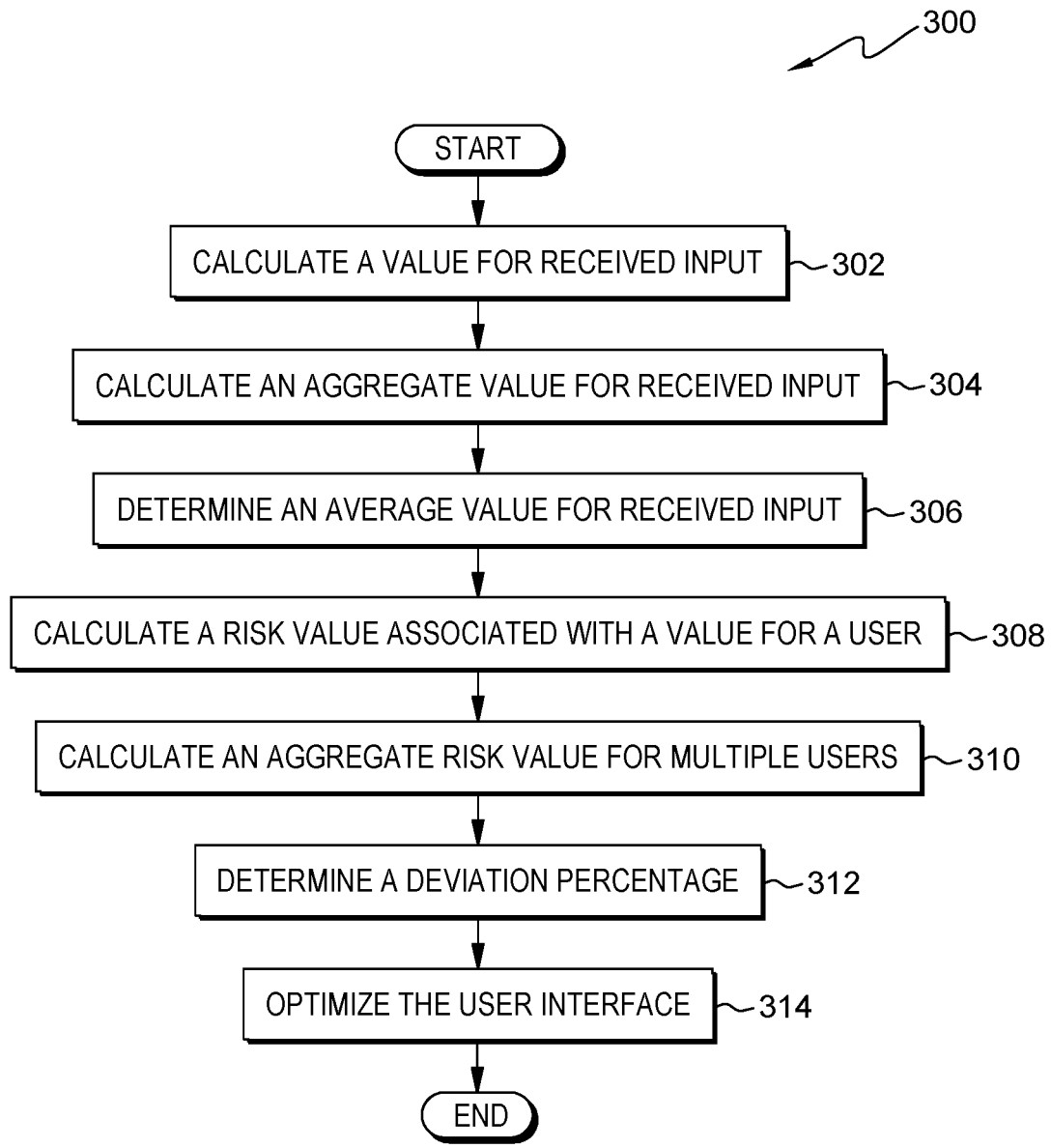
FIG. 3 is a flowchart illustrating operational steps for dynamically optimizing a user interface based on a risk analysis.

FIG. 3 is a flowchart 300 illustrating operational steps for dynamically optimizing the risk analysis within a user interface, in accordance with at least one embodiment of the present invention.

In step 302, the program 104 calculates a value for received input. In this embodiment, the program 104 calculates a value for received input by assigning a value to received input data and data associated with a risk analysis for a user. In this embodiment, the program 104 calculates a risk score for each identified risk in the received input based on priority risk factors affecting the respectively identified risk. In this embodiment, the program 104 calculates a value for received input by utilizing the following as a function:

$$x=(a+b+c)+e\% \quad (1)$$

With respect to equation (1), "a" represents a direct cost of the received input. "b" represents an indirect cost of the received input. "c" represents a fixed cost of the received input. "e %" represents a quality quotient or a percentage of total cost of the received input that was added, and equation (1) is used to calculate the cost of actual production for a product. In another embodiment, e % may be a negative number to represent the risk analysis as a high-risk level, which is a risk analysis score of 4 or higher. For example, the direct cost of wheat is $10 per acre, the indirect cost is $12.50 per acre, and the fixed cost is $5 per acre, which equals $27.50 per acre. In this example, there is a low risk so the quality quotient is 2.5, which makes "x" equals $30 per acre for the actual cost of production for wheat.

In step 304, the program 104 calculates an aggregate value for received input. In this embodiment, the program 104 calculates an aggregate value for received in by aggregating calculated values for multiple users and data associated with a risk analysis for multiple users. In this embodiment, the program 104 calculates an aggregate value for received input by utilizing the following as a function:

$$X=x1+x2+x3+\ldots xn \quad (2)$$

With respect to equation (2), "x1 . . . xn" represents a calculated cost for each received input associated with each user. "X" represents the aggregate value for calculated cost for received input for multiple users. The equation (2) is used to calculate the actual production cost of a community for a product. For example, x1 represents the price that user 1 would pay for a portion of the wheat, which is $30 per acre, x2 represents the price that user 2 would pay for a portion of the wheat, which is $30 per acre, and x3 represents the price that user 3 would pay for a portion of the wheat. Thus, user 1 would like a whole acre of wheat, user 2 would like a half acre of wheat, and user 3 would like a half acre of wheat, which totals $60 for two acres of wheat split between three users.

In step 306, the program 104 determines an average value for received input. In this embodiment, the program 104 determines an average value for received values by taking the aggregate value for received input divided by an identified quantity. In this embodiment, the program 104 identifies a quantity by using an artificial intelligence algorithm in combination with a machine learning algorithm to count values and items of data that are capable of being quantified. In this embodiment, the program 104 determines an average value for received values by utilizing the following as a function:

$$A=X/qn \quad (3)$$

With respect to equation (3), "qn" represents an actual quantity, and "A" represents the average value of the received input. The equation (3) is used to calculate the actual price of the product. For example, "X" equals $60, and even though it is 3 users, the actual quantity is measured in acres, which in this case is 2. Thus, $60 divided by 2 acres equals $30 average per acre.

In step 308, the program 104 calculates a risk value associated with a value for a user. In this embodiment, the program 104 calculates a risk value associated with a value for a user by dividing the identified quantity by a measure of weight or size. In this embodiment, the program 104 calculates a risk value by utilizing the following as a function:

$$y=q/s \quad (4)$$

With respect to equation (4), "q" represents the identified quantity, and "s" represents a scale, size, or measurement of a value, such as pounds, kilograms, or newtons. The equation (4) is used to calculate the actual requirement from individual user. For example, user 1 is seeking an acre of wheat as a quantity and the scale for 1 acre is 1 as a unit of measure. Thus, the actual requirement from user 1 is 1 because 1 divided by 1 equal 1.

In step 310, the program 104 calculates an aggregate risk value for multiple users. In this embodiment, the program 104 calculates an aggregate risk value for multiple users by aggregating calculated risk values for each user to determine the aggregate risk value. In this embodiment, the program 104 calculates an aggregate risk value for multiple users by utilizing the following as a function:

$$Y=y1+y2+y3+\ldots yn \quad (5)$$

With respect to equation (5), "Y" represents the aggregate risk value, and "y1 . . . yn" represent a calculated risk value associated with each user. The equation (5) is used to calculate the actual requirements for multiple users. For example, user 1 has an actual requirement of 1, user 2 has an actual requirement of 0.5, and user 3 has an actual requirement of 0.5. Thus, the actual requirements for the multiple users is 1 plus 0.5 plus 0.5, which equals 2.

In step 312, the program 104 determines a deviation percentage. In this embodiment, the program 104 determines a deviation percentage by subtracting the identified quantity of a value from the aggregate risk value. In this embodiment, the program 104 determines the deviation percentage to optimize a user interface that displays differences between calculated risks, aggregated risks, calculated values, and aggregated values for each user. In this embodiment, the program 104 determines a deviation percentage by utilizing the following as a function:

$$D=Y-qn \qquad (6)$$

With respect to equation (6), "D" represents the deviation percentage based on the aggregated risk minus the identified quantity. The equation (6) is used to calculate the percentage of deviation in quantity. For example, the calculated actual requirements for the multiple users is 2 and the identified quantity is 2. Thus, the deviation percentage is 0 as a result of 2 minus 2 equals 0.

In step 314, the program 104 optimizes the user interface of a computing device 102. In this embodiment, the program 104 optimizes the user interface of a computing device 102 by modifying the user interface based on aggregated values, aggregated risk values, and deviation percentages. In this embodiment, the program 104 defines optimization as a change in order, a change in value, or a change in weight for values and identified quantities. In another embodiment, the program 104 may define optimization as a method to increase efficiency performance within the computing device 102. For example, the program 104 calculates a value for a specific crop for an individual farmer; calculates an aggregate value for that specific crop for multiple farmers; determines the average value for the specific crop based on quantity; calculates a risk value based on customer input; calculates an aggregate risk value based on multiple customer's input; determines a deviation percentage between the calculated value for the crop and the calculated risk for that crop from customer input; and modifies the user interface to reflect the deviation percentage.

In another embodiment, the program 104 uses equations 1-6 to calculate a revised price based on actual risk factors shared by multiple users. In this embodiment, the program 104 transmits instructions to the computing device 102 to reduce a price for a manufactured product based on the risk analysis for multiple users. In this embodiment and in response to reducing the price for the manufactured product, the program 104 transmits instructions to the computing device 102 to identify a user with a lower risk score located within a predetermined proximity. In this embodiment and in response to transmitting the lower risk score, the program 104 transmits instructions to the computing device 102 to display alternate manufactured products on the user interface. In this embodiment and in response to calculating the revise price, the program 104 calculates a cost to deliver the manufactured product. In this embodiment, the program 104 transmits instructions to allow a user to directly acquire a manufactured product directly from another user without any delivery cost. In another embodiment, the program 104 transmits instructions to calculate the cost of delivery of the manufactured product based on a distance from one user to another user.

In this embodiment, the program 104 uses equations 1-6 to calculate a plurality of risk scores for respective identified risk, wherein calculating the plurality of risk scores comprises calculating a risk score for each identified risk by identifying an available amount of an output and dividing the identified, available amount of output by an amount of output required by a respective user. In response to calculating the plurality of risk scores, the program 104 prioritizes the calculated risk scores within the plurality of risk scores by arranging the calculated risk scores in sequential manner, with calculated risk scores having a greater value assigned a higher priority order than calculated risk scores having a lesser value. For example, a calculated risk score of 8 would be ranked higher than a calculated risk score of 2 (e.g., the calculated risk score of 8 would be placed in a first position (i.e., priority order) and the calculated risk score of 2 would be placed in a second position.

Figure 4:
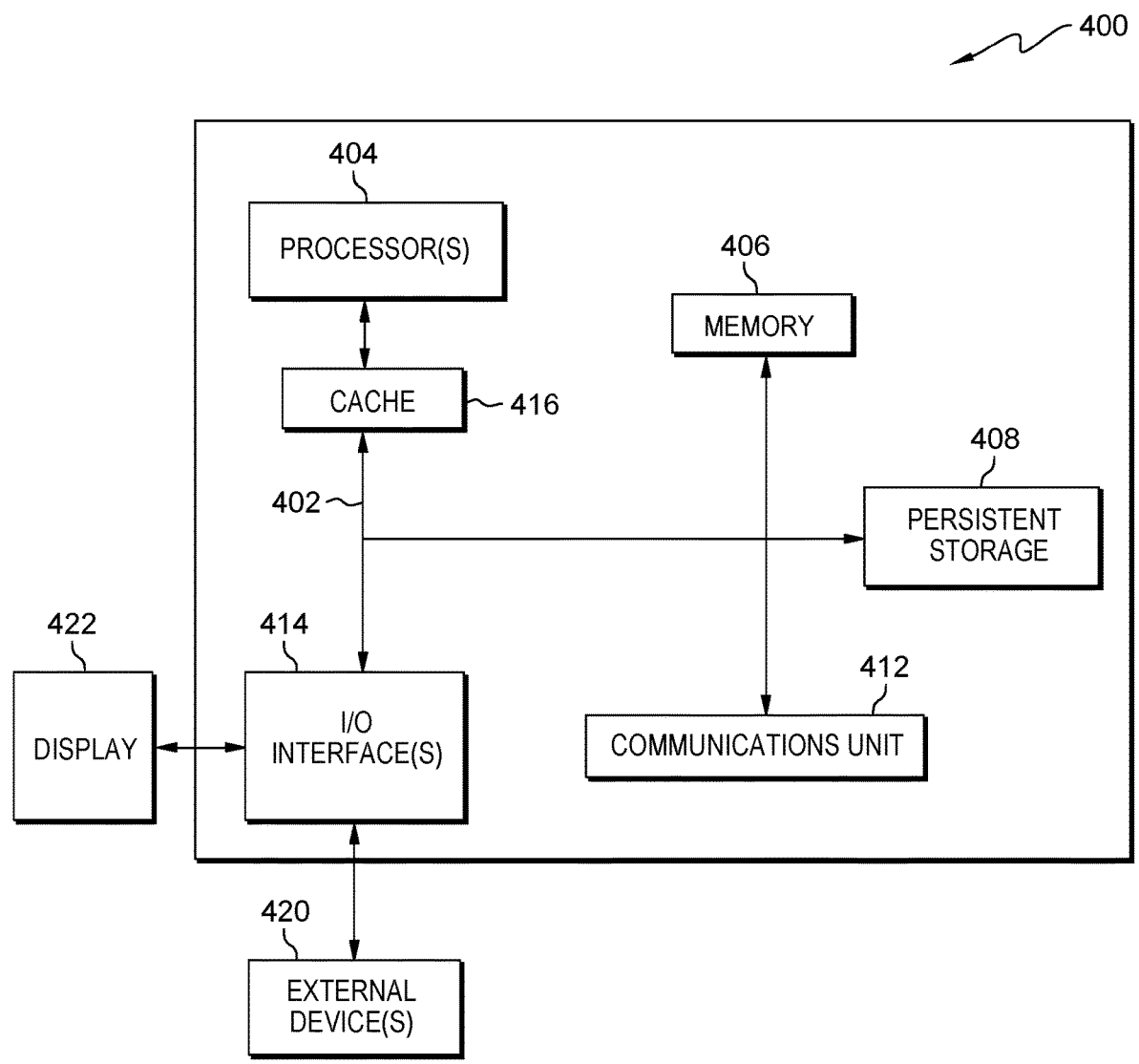
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, a display 422 and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 412 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving and storing input data of information of a good or service associated with a risk to obtain an amount of output of the good or service from at least two users, wherein the risk comprises a detriment in an ability to obtain the amount of the good or service from the at least two users;
   calculating a risk score for each identified risk in the received data based on priority risk factors affecting respectively identified risks;
   dynamically optimizing a risk analysis of the received input data of the information of the good or service associated with the risk to obtain the amount of output of the good or service for multiple users within a user interface of a computing device by recalculating risk scores based on the received data and identified risks; and
   generating a notification of an optimization of the user interface of the computing device based on the dynamic optimization of the risk analysis of the received input,
   wherein the calculating the risk score for each identified risk in the received data based on priority risk factors comprises:
   calculating a risk score for each user of the at least two users by analyzing risks associated with each user in a respective input of each user of the at least two users; and
   determining a priority order by arranging a plurality of risk scores of the at least two users in a sequential manner having a first set of the plurality of risk scores of the at least two users having a greater value assigned a higher priority order than a second set of the plurality of risk scores having a lesser value of the at least two users,
   wherein the dynamically optimizing the risk analysis of the received input for multiple users comprises dynamically optimizing the risk analysis within the user interface by modifying the risk analysis to reflect changes to a determination of the priority order for the at least two users based on the calculated risk score for each user of the at least two users,
   wherein the optimization of the user interface is based on the optimization of the risk analysis within the user interface and is utilized to improve efficiency in manufacturing the good or providing the service.

2. The computer-implemented method of claim 1, wherein calculating a risk score for each identified risk in the received data based on priority risk factors further comprises:
   identifying a risk in the received data by analyzing risks associated with the received data using a risk-based analysis engine;
   calculating a plurality of risk scores for each respective identified risk, wherein calculating the plurality of risk scores comprises calculating a risk score for each identified risk by:
      identifying an available amount of an output for the good or service from the at least two users, and
      dividing the identified, available amount of output for the good or service from the at least two users by an amount of output required by a respective user;
   determining a difference in a first calculated risk score of the plurality of risk scores to a second calculated risk score of the first of risk scores; and
   determining another priority order for each calculated risk score by arranging the calculated risk scores in the sequential manner having calculated risk scores having the greater value assigned the higher priority order than calculated risk scores having the lesser value.

3. The computer-implemented method of claim 2, wherein calculating a first risk score in a first score comprises generating an overall risk score by summing at least two identified risks associated with a respective user in the plurality of users using the risk-based engine.

4. The computer-implemented method of claim 1, wherein dynamically optimizing a risk analysis of the received input for multiple users comprises:
   determining an initial risk of a first received input, wherein the first received input comprises the information of the good or the service and the amount of output of the good or service;
   calculating cost of actual production of an output associated with the first received input, by adding a predetermined percentage of total cost of the output associated with the first received input to a summed calculated cost, wherein a summed calculated cost comprises:
      adding a direct cost of the output associated with the first received input to a fixed cost of the output associated with the first received input, and an indirect cost of the output associated with the first received input;
   in response to calculating cost of actual product of the output associated with the first received input, identifying at least one requirement from at least one user of multiple users;

introducing at least one identified risk associated with a respective user of multiple users to the calculated cost of the output associated with the first received input; and recalculating cost of the output associated with the first received input to by calculating an average cost for each user after the introduction at least one identified risk and dividing the average cost for each user by the calculated cost of the first received input, wherein the average cost for the respective user of multiple users is the calculated cost of actual production of the first received input divided by an actual quantity of the first received input.

5. The computer-implemented of claim 4, further comprising:
identifying the recalculated cost of the output associated with the first received input;
dividing the identified recalculated cost by the average cost of each user; and
verifying the recalculated cost by comparing the outcome of the division to a deviation percentage, wherein a positive verification results in the deviation percentage equaling one.

6. The computer-implemented method of claim 4, further comprising notifying at least two users of a recalculated cost associated with the received input for at least two users by transmitting confirmation of the received input based on the optimization and to automatically modify a user interface that displays the received input based on the risk analysis.

7. The computer-implemented method of claim 1, wherein dynamically optimizing a risk analysis of the received input further comprises:
identifying at least one change of a variable that affects at least one risk score associated with the received input;
automatically updating a calculated risk score based on at least one identified change of the variable that affects the calculated risk score associated with the received input; and
modifying the user interface to reflect a deviation percentage based on calculating a value of a product for a user, an aggregate value of the product for users, the average value for the product based on quantity, a risk value based on customer input, an aggregate risk value based on multiple customers' input, and a deviation percentage between the calculated value for the product and the calculated risk for that product from customer input.

8. A computer program product comprising:
one or more non-transitory computer readable storage media and program instructions stored on the one or more computer readable storage media, the program instructions comprising:
program instructions to receive and store input data of information of a good or service associated with a risk to obtain an amount of output of the good or service from at least two users, wherein the risk comprises a detriment in an ability to obtain the amount of the good or service from the at least two users;
program instructions to calculate a risk score for each identified risk in the received data based on priority risk factors affecting respectively identified risks;
program instructions to dynamically optimize a risk analysis of the received input data of the information of the good or service associated with the risk to obtain the amount of output of the good or service for multiple users within a user interface of a computing device by recalculating risk scores based on the received data and identified risks; and
program instructions to generate a notification of an optimization of the risk analysis to the user interface of the computing device based on the dynamic optimization of the risk analysis of the received input,
wherein the calculating the risk score for each identified risk in the received data based on priority risk factors comprises:
calculating a risk score for each user of the at least two users by analyzing risks associated with each user in a respective input of each user of the at least two users; and
determining a priority order by arranging a plurality of risk scores of the at least two users in a sequential manner having a first set of the plurality of risk scores of the at least two users having a greater value assigned a higher priority order than a second set of the plurality of risk scores having a lesser value of the at least two users,
wherein the dynamically optimizing the risk analysis of the received input for multiple users comprises dynamically optimizing the risk analysis within the user interface by modifying the risk analysis to reflect changes to a determination of the priority order for the at least two users based on the calculated risk score for each user of the at least two users,
wherein the optimization of the user interface is based on the optimization of the risk analysis within the user interface and is utilized to improve efficiency in manufacturing the good or providing the service.

9. The computer program product of claim 8, wherein the program instructions to calculate a risk score for each identified risk in the received data based on priority risk factors further comprise:
program instructions to identify a risk in the received data by analyzing risks associated with the received data using a risk-based analysis engine;
program instructions to calculate a plurality of risk scores for each respective identified risk, wherein calculating the plurality of risk scores comprise program instructions to calculate a risk score for each identified risk by:
program instructions to identify an available amount of an output for the good or service from the at least two users, and
program instructions to divide the identified, available amount of output for the good or service from the at least two users by an amount of output required by a respective user;
program instructions to determine a difference in a first calculated risk score of the plurality of risk scores to a second calculated risk score of the first of risk scores; and
program instructions to determine another priority order for each calculated risk score by arranging the calculated risk scores in the sequential manner having calculated risk scores having the greater value assigned the higher priority order than calculated risk scores having the lesser value.

10. The computer program product of claim 9, wherein the program instructions to calculate a first risk score in a first score comprise program instructions to generate an overall risk score by summing at least two identified risks associated with a respective user in the plurality of users using the risk-based engine.

11. The computer program product of claim 8, wherein the program instructions to dynamically optimize a risk analysis of the received input for multiple users comprise:
  program instructions to determine an initial risk of a first received input, wherein the first received input comprises the information of the good or the service and the amount of output of the good or service;
  program instructions to calculate cost of actual production of an output associated with the first received input, by adding a predetermined percentage of total cost of the output associated with the first received input to a summed calculated cost, wherein a summed calculated cost comprises:
    program instructions to add a direct cost of the output associated with the first received input to a fixed cost of the output associated with the first received input, and an indirect cost of the output associated with the first received input;
  in response to the program instructions to calculate cost of actual product of the output associated with the first received input, program instructions to identify at least one requirement from at least one user of multiple users;
  program instructions to introduce at least one identified risk associated with a respective user of multiple users to the calculated cost of the output associated with the first received input; and
  program instructions to recalculate cost of the output associated with the first received input to by calculating an average cost for each user after the introduction at least one identified risk and dividing the average cost for each user by the calculated cost of the first received input, wherein the average cost for the respective user of multiple users is the calculated cost of actual production of the first received input divided by an actual quantity of the first received input.

12. The computer program product of claim 11, wherein the program instructions stored on the one or more non-transitory computer readable storage media further comprise:
  program instructions to identify the recalculated cost of the output associated with the first received input;
  program instructions to divide the identified recalculated cost by the average cost of each user; and
  program instructions to verify the recalculated cost by comparing the outcome of the division to a deviation percentage, wherein a positive verification results in the deviation percentage equaling one.

13. The computer program product of claim 11, wherein the program instructions stored on the one or more computer readable storage medium further comprise program instructions to notify at least two users of a recalculated cost associated with the received input for at least two users by transmitting notifications to alert a change to the received input based on the optimization and to automatically modify a user interface that displays the received input based on the risk analysis.

14. The computer program product of claim 8, wherein the program instructions to dynamically optimize a risk analysis of the received input for multiple users within the user interface of a computing device comprise:
  program instructions to identify at least one change of a variable that affects at least one risk score associated with the received input;
  program instructions to automatically update a calculated risk score based on at least one identified change of the variable that affects the calculated risk score associated with the received input; and
  program instructions to modify the user interface based on recalculating a revised price based on actual risk factors shared by the multiple users.

15. A computer system comprising:
  one or more computer processors;
  one or more computer readable storage media; and
  program instructions stored on the one or more computer readable storage media for execution by at least one of the one or more computer processors, the program instructions comprising:
    program instructions to receive and store input data of information of a good or service associated with a risk to obtain an amount of output of the good or service from at least two users, wherein the risk comprises a detriment in an ability to obtain the amount of the good or service from the at least two users;
    program instructions to calculate a risk score for each identified risk in the received data based on priority risk factors affecting respectively identified risks;
    program instructions to dynamically optimize a risk analysis of the received input data of information of a good or service associated with a risk to obtain an amount of output of the good or service for multiple users within a user interface of a computing device by recalculating risk scores based on the received data and identified risks; and
  program instructions to generate a notification of an optimization of the risk analysis to the user interface of the computing device based on the dynamic optimization of the risk analysis of the received input,
    wherein the calculating the risk score for each identified risk in the received data based on priority risk factors comprises:
      calculating a risk score for each user of the at least two users by analyzing risks associated with each user in a respective input of each user of the at least two users; and
      determining a priority order by arranging a plurality of risk scores of the at least two users in a sequential manner having a first set of the plurality of risk scores of the at least two users having a greater value assigned a higher priority order than a second set of the plurality of risk scores having a lesser value of the at least two users,
    wherein the dynamically optimizing the risk analysis of the received input for multiple users comprises dynamically optimizing the risk analysis within the user interface by modifying the risk analysis to reflect changes to a determination of the priority order for the at least two users based on the calculated risk score for each user of the at least two users,
    wherein the optimization of the user interface is based on the optimization of the risk analysis within the user interface and is utilized to improve efficiency in manufacturing of a product the good or providing the service.

16. The computer system of claim 15, wherein the program instructions to calculate a risk score for each identified risk in the received data based on priority risk factors further comprise:
  program instructions to identify a risk in the received data by analyzing risks associated with the received data using a risk-based analysis engine;

program instructions to calculate a plurality of risk scores for each respective identified risk, wherein calculating the plurality of risk scores comprise program instructions to calculate a risk score for each identified risk by:
  program instructions to identify an available amount of an output for the good or service from the at least two users, and
  program instructions to divide the identified, available amount of output for the good or service from the at least two users by an amount of output required by a respective user;
program instructions to determine a difference in a first calculated risk score of the plurality of risk scores to a second calculated risk score of the first of risk scores; and
program instructions to determine another priority order for each calculated risk score by arranging the calculated risk scores in the sequential manner having calculated risk scores having the greater value assigned the higher priority order than calculated risk scores having the lesser value.

17. The computer system of claim 16, wherein program instructions to calculate a first risk score in a first score comprise program instructions to generate an overall risk score by summing at least two identified risks associated with a respective user in the plurality of users using the risk-based engine.

18. The computer system of claim 15, wherein the program instructions to dynamically optimize a risk analysis of the received input for multiple users comprise:
  program instructions to determine an initial risk of a first received input, wherein the first received input comprises the information of the good or the service and the amount of output of the good or service;
  program instructions to calculate cost of actual production of an output associated with the first received input, by adding a predetermined percentage of total cost of the output associated with the first received input to a summed calculated cost, wherein a summed calculated cost comprise:
    program instructions to add a direct cost of the output associated with the first received input to a fixed cost of the output associated with the first received input, and an indirect cost of the output associated with the first received input;
  in response to the program instructions to calculate cost of actual product of the output associated with the first received input, program instructions to identify at least one requirement from at least one user of multiple users;
  program instructions to introduce at least one identified risk associated with a respective user of multiple users to the calculated cost of the output associated with the first received input; and
  program instructions to recalculate cost of the output associated with the first received input to by calculating an average cost for each user after the introduction at least one identified risk and dividing the average cost for each user by the calculated cost of the first received input, wherein the average cost for the respective user of multiple users is the calculated cost of actual production of the first received input divided by an actual quantity of the first received input.

19. The computer system of claim 18, wherein the program instructions stored on the one or more computer readable storage medium further comprise:
  program instructions to identify the recalculated cost of the output associated with the first received input;
  program instructions to divide the identified recalculated cost by the average cost of each user; and
  program instructions to verify the recalculated cost by comparing the outcome of the division to a deviation percentage, wherein a positive verification results in the deviation percentage equaling one.

20. The computer system of claim 15, wherein the program instructions to dynamically optimize a risk analysis of the received input for multiple users within the user interface of a computing device comprise:
  program instructions to identify at least one change of a variable that affects at least one risk score associated with the received input;
  program instructions to automatically update a calculated risk score based on at least one identified change of the variable that affects the calculated risk score associated with the received input; and
  program instructions to modify the user interface based on recalculating aggregated values of an actual production cost of a community for a product, aggregated risk values of actual requirements for multiple users of the product, and deviation percentages in quantity of the product.

* * * * *